United States Patent Office 2,709,931
Patented June 7, 1955

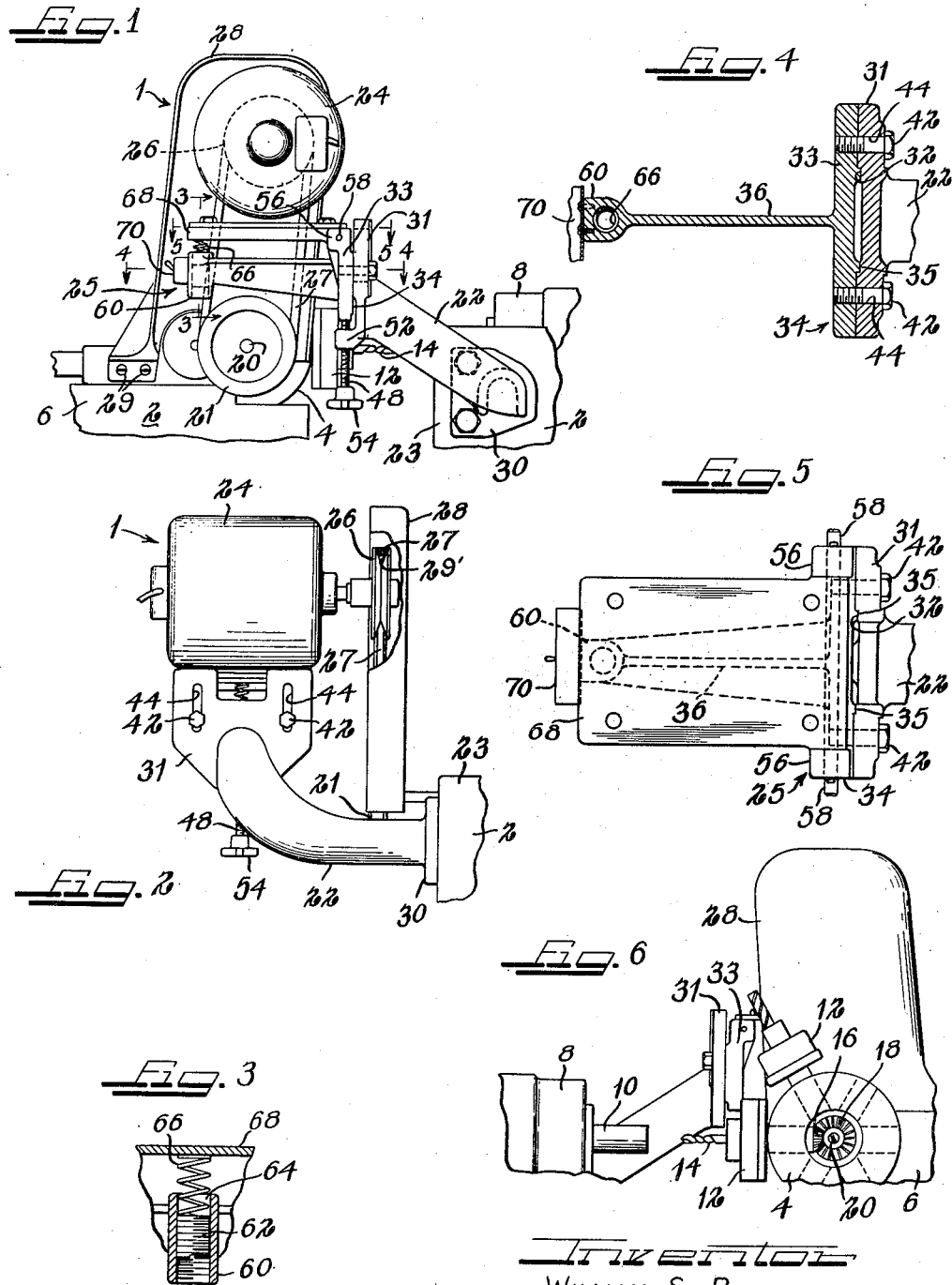

2,709,931

DEEP DRILLER DRIVE

William S. Bunnell, Chicago, Ill., assignor to Boyar-Schultz Corporation, Broadview, Ill., a corporation of Illinois Application September 30, 1954, Serial No. 459,227

12 Claims. (Cl. 77—5)

This invention relates to machine tools, and more particularly to a power drive for rotating drills or other tools held in the turrets of automatic screw machines. Some aspects of the invention, however, have a more general application.

The present invention is particularly applicable to automatic screw machines of the type that include a rotatable work holder, and a tool-holding turret which may be advanced toward the work to effect drilling, reaming, etc. of holes in the work. In drilling a hole which is deep in relation to its diameter, on a turret lath or an automatic screw machine, it is often desirable to rotate the drill at the same time that the work rotates. Rotary motion is usually transmitted to the tools on the turret through a pulley carried by the turret and belt driven by a suitable drive source. As the turret slide is moved toward or away from the work, the driven pulley on the turret slide moves with the turret slide. As a result, the distance between the drive and driven pulleys varies, with consequent change in the tension in the drive belt.

It is one of the objects of this invention to provide a power drive for a machine tool utilizing belts and pulleys for coupling rotary motion to a rotatable tool or other rotatable member which is translated during a machining operation, and wherein the tension on the drive belt varies only slightly as one of the pulleys moves with the rotatable translated member.

It is still another object of the invention to provide a power drive for rotating the tools held in a reciprocable turret of an automatic screw machine, wherein the power drive includes an electric motor supported by the stationary frame of the machine so that the weight of the motor is not carried by the turret slide. A further object of the invention is to provide an efficient pulley and drive belt transmission for coupling the rotation of the aforesaid motor to the turret, wherein the transmission operates with a near maximum efficiency irrespective of the position of the turret slide.

It is a still further object of the invention to provide a power drive as above described which includes means for increasing and decreasing the spacing between the pulleys for a given turret slide position so that the tension of the drive belt may be adjusted to an optimum or near optimum value even though the length of the drive belt or the diameter of one or more of the pulleys is varied.

Another object of the invention is to provide a self-contained power drive for rotating the tools held in a turret of an automatic screw machine, which power drive is compact and readily mountable on the frame of and connectible with the turret drive shaft of the automatic screw machine.

The present invention is particularly useful for providing a machine of the character above described with an auxiliary power drive for driving a deep drill of the type shown in my pending application filed of even date herewith that is mounted on the turret of the machine.

The means by which the above and other objects of the invention are attained will become apparent from the following specification, taken in conjunction with the drawings showing one preferred embodiment of the invention.

Fig. 1 is a left hand elevational view of a power drive attachment of the present invention shown connected to an automatic screw machine;

Fig. 2 is a front elevational view thereof;

Fig. 3 is a fragmentary sectional view taken along section line 3—3 of Fig. 1;

Fig. 4 is a sectional view taken along section line 4—4 in Fig. 1;

Fig. 5 is a top plan view of the attachment of Fig. 1 with the motor and attachment pulley and pulley belt omitted; and Fig. 6 is a fragmentary side elevational view on the opposite side of the machine tool apparatus from that shown in Fig. 1.

Reference should now be made to the drawings where like reference numerals indicate like elements throughout.

The power drive attachment, generally indicated by the reference numeral 1, is shown connected to an automatic screw machine 2 having a turret 4 mounted for pivotal movement about a horizontal axis on a turret slide 6. The turret slide 6 is mounted for fore and aft movement relative to a spindle-holding head 8 of the automatic screw machine in which head a cylindrical piece of bar stock 10 is mounted for rotation in the usual manner.

A number of tool holders 12 are shown (Fig. 6) extending radially from the turret periphery, and rotation is imparted to the tool 14 which projects horizontally from the turret through a gear coupling including a small pinion gear 16 rotatably supported in the tool holder 12 and a cooperating driving bevel gear 18 fixed to a laterally extending, horizontal drive shaft 20 associated with the turret 4.

The turret drive shaft 20 carries a pulley 21 (Figs. 1 and 2) which is driven by the power drive attachment 1. The power drive attachment is supported by a mounting arm 22 to a stationary part 23 of the automatic screw machine 2.

The attachment 1 includes an electric motor 24 having a shaft extending laterally of the automatic screw machine along a horizontal axis. A mounting assembly 25, to be described, pivotally supports the motor about a horizontal lateral axis so that it is swingable toward and away from the turret pulley 21 which it drives in vertical planes extending parallel to the direction of movement of the turret slide. The motor shaft carries a drive pulley 26 whose medial plane is coplanar with the medial plane of the turret pulley 21. A resilient drive belt 27 extends between the pulleys 26 and 21.

A pulley belt guard 28 encloses the drive pulley, the drive belt and the upper portion of the driven turret pulley. The guard 28 is bolted to the turret slide at 29. Since the guard 28 moves with the turret, clearance between the drive pulley and the guard walls is provided to permit of relative longitudinal movement therebetween occurring when the turret slide is moved toward or away from the work.

The drive pulley is shown as being of the variable speed type wherein the pulley is made in two axially spaced sections where the opposing faces of the pulley sections define a V-shaped peripheral belt-receiving groove 29′ (Fig. 2). The pulley belt 27 has tapered sides corresponding to the taper of the groove. With this arrangement, the effective diameter of the drive pulley and hence the ratio of the speeds of rotation of the driven to the drive pulleys may be varied by varying the spacing of the pulley sections which in turn varies the radial portion of the pulley groove occupied by the drive pulley.

The structural details of the mounting arm 22 and the mounting means 25 which pivotally supports the motor 24 will now be described.

The mounting arm 22 is a metal casting of an inverted U-shaped cross section, and has cast integrally therewith a mounting plate 30 which is bolted to the stationary part 23 of the automatic screw machine. The arm 22 curves rearwardly and outwardly from the mounting plate and terminates in a vertically extending guideway 32 which slidably receives the mounting head 33 of a motor pivot angle support bracket 34.

The head 33 and the flange 31 have flat opposed vertical faces which are in engagement, and the head 33 has a pair of horizontally spaced vertical ribs 35 which extend into and are in sliding engagement with the walls of the flange guideway 32. The bracket 34 has an arm 36 extending rearwardly from the medial regions of the head 33.

The motor pivot bracket 34 is slidably secured to the mounting arm flange 31 by a pair of laterally spaced bolts 42 which pass through respective vertical slots 44 formed in the mounting arm flange and thread into the bracket head 33.

The elevation or vertical position of the pivot support bracket 34 with respect to the mounting arm is adjusted by means of a vertical threaded screw 48 which is threaded into a vertical bore formed in a lug 52 projecting horizontally from the bottom of the mounting arm flange midway of the lateral edges thereof. The top of the screw 48 bears against the bottom of the bracket head 33. A hand knob 54 at the bottom of the bracket adjusting screw 48 facilitates turning of the screw 48. After adjusting the vertical position of the bracket 34, the previously loosened bolts 42 are tightened to force the bolt heads against the mounting arm flange to secure the bracket 34 rigidly to the flange 31.

The bracket head 33 has laterally spaced ears 56 between which a horizontal hinge pin 58 extends.

The distal end of the horizontal bracket arm 36 has a vertically extending tubular portion 60 in which is threaded a headless screw 62, the top of which acts as an adjustable support for a helical compression spring 66 in a socket 64 formed by the tubular portion 60. The top of the helical spring projects above the bracket arm 36 and resiliently seats one end of a rectangular motor mounting plate 68. The other end of the motor mounting plate is pivotally supported about the hinge pin 58 and extends between the inner faces of the bracket ears 56. The base of the motor is bolted to the top of the mounting plate 68. An electric switch 70 for controlling the operation of the motor 24 is secured to the tubular portion 60.

The forces acting on the helical spring 66 include the weight of the motor 24 and the attached pulley and drive belt plus the pull of the drive belt on the drive pulley. These forces place the helical spring 66 under compression, and the amount of this compression varies with the tension in the drive belt.

In the drawings, the center of the driven pulley is shown in a position rearwardly of the center of the drive pulley. Thus, assuming that the turret slide moves to the right as viewed in Fig. 1, as the center of the driven pulley moves into a position where it is immediately below the center of the drive pulley, the distance between these pulley centers decreases which in turn decreases the pulley belt tension. Accordingly, the pull of the drive belt on the drive pulley is lessened somewhat which in turn lessens the force tending to compress the spring 66. The spring thus moves the motor mounting plate 68 upwardly in a clockwise turning movement about the pivot pin 58, as viewed in Fig. 1. This moves the center of the drive pulley away from the center of the driven pulley, thus counteracting the change in the distance between the pulley centers caused by the forward movement of the turret pulley 21. The pulley belt tension thus remains near its original, optimum value. This belt tension stabilizing action also occurs, of course, for rearward movement of the turret slide.

Where the speed ratio between the drive and driven pulleys is varied by varying the axial spacing between the pulley sections of the drive pulley, as above explained, the tension in the drive belt is varied from the desired optimum value. The belt tension can be brought back to this value by varying the initial distance or spacing between the axes of rotation of the drive and driven pulleys. This can be accomplished by varying the elevation of the motor pivot support bracket 34 in the manner above explained. Thus, the bolts 42 are loosened and the screw 48 is threaded further into or further out of the mounting arm lug 52 to adjust the spacing between the axes of the drive and driven pulleys to obtain the desired pulley belt tension.

In compliance with the requirements of the patent statutes I have here shown and described a preferred embodiment of my invention. It is, however, to be understood that the invention is not limited to the precise construction here shown, the same being merely illustrative of the principles of the invention.

What I consider new and desire to secure by Letters Patent is:

1. In a machine tool having a work-holding member, a tool-holding member, a movable support for one of said members, and means for moving said support toward the other member during a machining operation, a power transmission for transmitting rotary motion to said one member, said transmission including a driven transmission-actuating pulley, means for supporting said pulley for movement bodily with said one member during a machining operation, a drive pulley, a drive belt connecting said pulleys, a support for the drive pulley, means mounting the latter support movably on a part of said machine which is spaced from the former support for movement in a direction having a component in the direction of pull of the drive belt on the drive pulley, and said last-mentioned means including spring means urging said latter support away from said driven pulley.

2. In a machine tool having a work-holding member, a tool-holding member, a movable support for one of said members, and means for moving said support toward the other member during a machining operation, a power transmission for transmitting rotary motion to said one member, said transmission including a driven transmission-actuating pulley, means for supporting said pulley for movement bodily with said one member during a machining operation, a drive pulley, a drive belt connecting said pulleys, an electric motor driving the drive pulley, means mounting said motor and drive pulley movably on a part of said machine which is spaced from said movable support for movement in a direction having a component in the direction of pull of the drive belt on the drive pulley, and said last-mentioned means including spring means urging said motor and drive pulley away from said driven pulley.

3. In a machine tool having a work-holding member, a tool-holding member, a movable support for one of said members, and means for moving said support toward the other member during a machining operation, a power transmission means for transmitting rotary motion to said one member, said transmission including a driven transmission actuating pulley, means for supporting said pulley for movement bodily with said one member during the machining operation, a drive pulley, a drive belt connecting said pulleys, a support for said drive pulley, means pivotally supporting the latter support on a part of the machine which is spaced from said former support for movement in a direction having a component in the direction of pull of the belt on the drive pulley, resilient means urging said drive pulley in a direction away from said driven pulley, and means for bodily shifting said resilient means, pivot support means, and said drive pulley support with respect to the driven pulley to vary the spacing between said pulleys.

4. An automatic screw machine having a work-holding member, a tool-holding turret member and a turret slide on which one of the members is mounted, means for moving the slide toward the other member during a machining operation, a power transmission for transmitting rotary motion to said one member, said transmission including a driven pulley, means for supporting said driven pulley for movement bodily with said slide during a machining operation, a drive pulley, a drive belt connecting said pulleys, a support for the drive pulley, means mounting said support movably on a part of the machine which is spaced from said turret slide for movement in a direction having a component in the direction of pull of the drive belt on the drive pulley, and said last-mentioned means including spring means urging said support away from said driven pulley.

5. In a machine tool having a work-holding member, a tool-holding member and means for moving one of said members toward the other, a power transmission for transmitting rotary motion to said one member, said transmission including spaced, aligned, drive and driven pulleys having respective axes of rotation at right angles to the direction of movement of said one member, a drive belt connecting said pulleys, means for transmitting the rotary motion of said driven pulley to said one member and for supporting said driven pulley for movement bodily with said one member and relative to said drive pulley, a support for said drive pulley, means mounting said support movably on said machine for movement in a direction having a component in the direction of pull of the drive belt on the drive pulley, and said last-mentioned means including resilient means for urging said drive pulley away from said driven pulley.

6. In a machine tool having a work-holding member, a tool-holding member and means for moving one of said members toward the other member during a machining operation, a power transmission for transmitting rotary motion to said one member, said transmission comprising drive and driven pulleys, a belt connecting said pulleys, means for transmitting the rotary motion of said driven pulley to said one member and for supporting said driven pulley for bodily movement with said one member and relative to said drive pulley during a machining operation, an electric motor driving the drive pulley, means mounting said motor and drive pulley movably on a part of the machine for movement in a direction having a component in the direction of pull of said drive belt on said drive pulley, said last-mentioned means including spring means urging said motor away from said driven pulley, and means for bodily moving said mounting means, said motor and said spring means to vary the spacing between said drive and driven pulleys.

7. A power drive for a machine tool for transmitting a rotary motion to a pulley supported on the machine comprising, an electric motor and a drive pulley to be driven by said motor, means for supporting said motor and drive pulley, a mounting member, and means for adjustably securing said motor and drive belt supporting means to said mounting member to vary the spacing between said pulleys, said latter means comprising means for slidably supporting said supporting means for movement on said mounting member, a movable position-adjusting member supported from said mounting member and against which said supporting means bears, means for gradually varying the position of said adjusting member so as to vary the position of said supporting means bearing thereagainst, and locking bolts threaded into one of said mounting member and supporting means and extending through elongated slots in the other of these elements for securely locking the supporting means in one of its adjusted positions.

8. A power drive attachment attachable to a machine tool for transmitting rotary motion to a pulley to be supported thereon comprising, a support, an electric motor and a drive pulley to be driven by said motor carried by said support, a pivot bracket pivotally mounting said support, a spring extending from said pivot bracket at a point spaced from the pivot axis of said motor and supporting the distal end of said support, a mounting member attachable to a part of the machine tool, means movably supporting said pivot bracket from said mounting member, said means including an adjusting screw threaded through a portion of said mounting member and having an end against which said pivot bracket bears so that rotation of the screw imparts movement to the pivot bracket.

9. A power drive attachment attachable to a machine tool for transmitting a rotary motion to a pulley supported on the machine comprising, an electric motor and a drive pulley to be driven by said motor, support means carrying said motor and drive pulley, a mounting member attachable with a part of the machine tool, and means for adjustably securing said motor and drive belt supporting means to said mounting member to vary the spacing between said pulleys, said latter means comprising means for slidably supporting said supporting means for vertical movement on said mounting member, a vertically extending position-adjusting screw threaded through said mounting member, the upper end of said screw seating said supporting means, and a hand knob on the bottom end of said screw for varying the elevation of the top of said screw.

10. A power drive attachment for mounting on a machine, said attachment comprising a mounting arm having at one end thereof means for securing it to a machine, the opposite end constituting a clamping surface, an angle support bracket having a pair of arms at substantially right angles to one another, means clamping one of said arms to the clamping surface of the mounting arm, said one arm of the angle support and said clamping surface having means for preventing relative turning of the two while permitting relative longitudinal sliding of one with respect to the other, screw means carried by one of said mounting arm and said angle support bracket for effecting shifting of one with respect to the other, means for locking the angle support bracket to the mounting arm in their relatively adjusted positions, an electric motor, means pivotally mounting the motor on the angle support bracket for pivotal movement about an axis at right angles to the direction of longitudinal sliding movement of the angle support bracket on said mounting arm, spring means urging the motor for pivoting movement in one direction, and means for adjusting the force of said spring means between maximum and minimum limits while the mounting arm, angle support bracket and motor are in operative assembled position and secured to a machine.

11. A power drive attachment for mounting on a machine, said attachment comprising a mounting arm having at one end thereof means for securing it to a machine, the opposite end constituting a clamping surface, an angle support bracket having a pair of arms at substantially right angles to one another, means clamping one of said arms to the clamping surface of the mounting arm, said one arm of the angle support and said clamping surface having means for preventing relative turning of the two while permitting relative longitudinal sliding of one with respect to the other, screw means carried by one of said mounting arm and said angle support bracket for effecting shifting of one with respect to the other, means for locking the angle support bracket to the mounting arm in their relatively adjusted positions, an electric motor, means pivotally mounting the motor on the angle support bracket for pivotal movement about an axis at right angles to the direction of longitudinal sliding movement of the angle support bracket on said mounting arm, an adjustable diameter belt driving pulley on said motor shaft, a belt driven thereby, spring means urging the motor for pivoting movement in one direction opposite to the direction of pull of a belt on said pulley, whereby the spring means is one of the factors controlling the tension of the belt, and means for adjusting the force of said spring means between maximum and minimum limits while the mounting arm, angle support bracket and motor are in operative assembled position and secured to a machine, whereby the spring can be adjusted to counteract tendency for change in belt tension resulting from a change in effective pulley diameter.

12. A power drive attachment for mounting on a machine, said attachment comprising a mounting arm having at one end thereof means for securing it to a machine, the opposite end of the mounting arm constituting a substantially flat vertically extending clamping surface member, an angle support bracket member having a pair of arms at substantially right angles to one another, means clamping one of said arms to the clamping surface of the mounting arm, said one arm of the angle support and said clamping surface having means for preventing relative lateral shifting of the two while permitting relative longitudinal sliding of one with respect to the other, screw means carried by one of said mounting arm and said angle support bracket and bearing on the other for effecting longitudinal shifting of one with respect to the other, locking bolts threaded into one of said members and extending through longitudinally extending slots in the other member and drawing the two members together for locking the angle support bracket to the mounting arm in their relatively adjusted positions, an electric motor, means pivotally mounting the motor on the angle support bracket for pivotal movement about an axis above said other arm of the angle support bracket and at right angles to the direction of longitudinal sliding movement of the angle support bracket on said mounting arm, an adjustable diameter belt driving pulley on said motor shaft, a belt driven thereby, spring means between the motor and said other arm of the angle support bracket and urging the motor for pivoting movement in one direction opposite to the direction of pull of a belt on said pulley, whereby the spring means is one of the factors controlling the tension of the belt, and means for adjusting the force of said spring means between maximum and minimum limits while the mounting arm, angle support bracket and motor are in operative assembled position and secured to a machine, whereby the spring can be adjusted to counteract tendency for change in belt tension resulting from a change in effective pulley diameter.

References Cited in the file of this patent

UNITED STATES PATENTS

| | | |
|---|---|---|
| 2,581,258 | Karweit | Jan. 1, 1952 |
| 2,645,952 | Bunnell | July 21, 1953 |